(12) United States Patent
Yang et al.

(10) Patent No.: US 12,055,228 B2
(45) Date of Patent: Aug. 6, 2024

(54) VALVE FOR THROTTLING GAS FLOW FROM A SEMICONDUCTOR PROCESSING TOOL

(71) Applicant: Taiwan Semiconductor Manufacturing Company Limited, Hsin-Chu (TW)

(72) Inventors: Sheng-Chun Yang, Tainan (TW); Po-Chih Huang, Tainan (TW); Chang Chun, Tainan (TW); Xuan-Yang Zheng, Tainan (TW); Tzu-Chuan Chao, Tainan (TW); Ren-Jyue Wang, Tainan (TW); Yi-Ming Lin, Tainan (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 0 days.

(21) Appl. No.: 17/716,046

(22) Filed: Apr. 8, 2022

(65) Prior Publication Data
US 2022/0403945 A1    Dec. 22, 2022

Related U.S. Application Data

(60) Provisional application No. 63/212,585, filed on Jun. 18, 2021.

(51) Int. Cl.
*F16K 24/06*    (2006.01)
*F16K 1/22*    (2006.01)

(52) U.S. Cl.
CPC .............. *F16K 24/06* (2013.01); *F16K 1/221* (2013.01)

(58) Field of Classification Search
CPC .......... F16K 1/221; F16K 1/446; F16K 1/222; F16K 24/06; H01J 37/32715; H01L 2224/75102
USPC ........................................................ 251/119
See application file for complete search history.

(56) References Cited

U.S. PATENT DOCUMENTS

| | | | | |
|---|---|---|---|---|
| 1,990,309 | A * | 2/1935 | Phillips ................... | F16K 1/228 251/173 |
| 3,532,321 | A * | 10/1970 | Bowman ................. | F16K 1/226 251/306 |
| 3,782,685 | A * | 1/1974 | Gallagher ............... | F16K 1/221 74/18.1 |
| 4,077,432 | A * | 3/1978 | Herr ........................ | F16K 1/165 137/246.22 |
| 10,443,127 | B2 * | 10/2019 | Hsieh ................. | C23C 16/45593 |
| 2014/0087092 | A1* | 3/2014 | Nieh ..................... | H01M 4/139 118/723 VE |

(Continued)

*Primary Examiner* — Reinaldo Sanchez-Medina
*Assistant Examiner* — Nicole Gardner
(74) *Attorney, Agent, or Firm* — Cooper Legal Group, LLC

(57) ABSTRACT

A valve for throttling gas flow from a semiconductor processing tool includes a valve body. A shaft extends through the valve body. The shaft defines an internal cavity and a first opening communicating with the internal cavity. A first deflector is positioned on the shaft proximate the first opening and directed at a first interface between the shaft and the valve body. A method for throttling gas flow from a semiconductor processing tool includes providing a gas in an internal cavity defined in a shaft of a valve and directing the gas through an opening defined in the shaft and communicating with the bore toward an interface between the shaft and a valve body of the valve supporting the shaft.

20 Claims, 7 Drawing Sheets

(56) References Cited

U.S. PATENT DOCUMENTS

2022/0037169 A1  2/2022  Yang et al.

* cited by examiner

VALVE FOR THROTTLING GAS FLOW FROM A SEMICONDUCTOR PROCESSING TOOL

RELATED APPLICATION

This application claims priority to U.S. Provisional Patent Application 63/212,585 titled "VALVE" and filed on Jun. 18, 2021, which is incorporated herein by reference.

BACKGROUND

Some semiconductor fabrication processes are performed under vacuum conditions. One or more pumps and valves are coupled to a process chamber to generate the vacuum conditions. Process gases are exhausted from the process chamber during or after the fabrication process using the pumps and valves. During the fabrication process, a semiconductor wafer may be supported on one or more supports. The vacuum source for the process chamber may be employed to generate a vacuum at the support surface for holding the semiconductor wafer.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
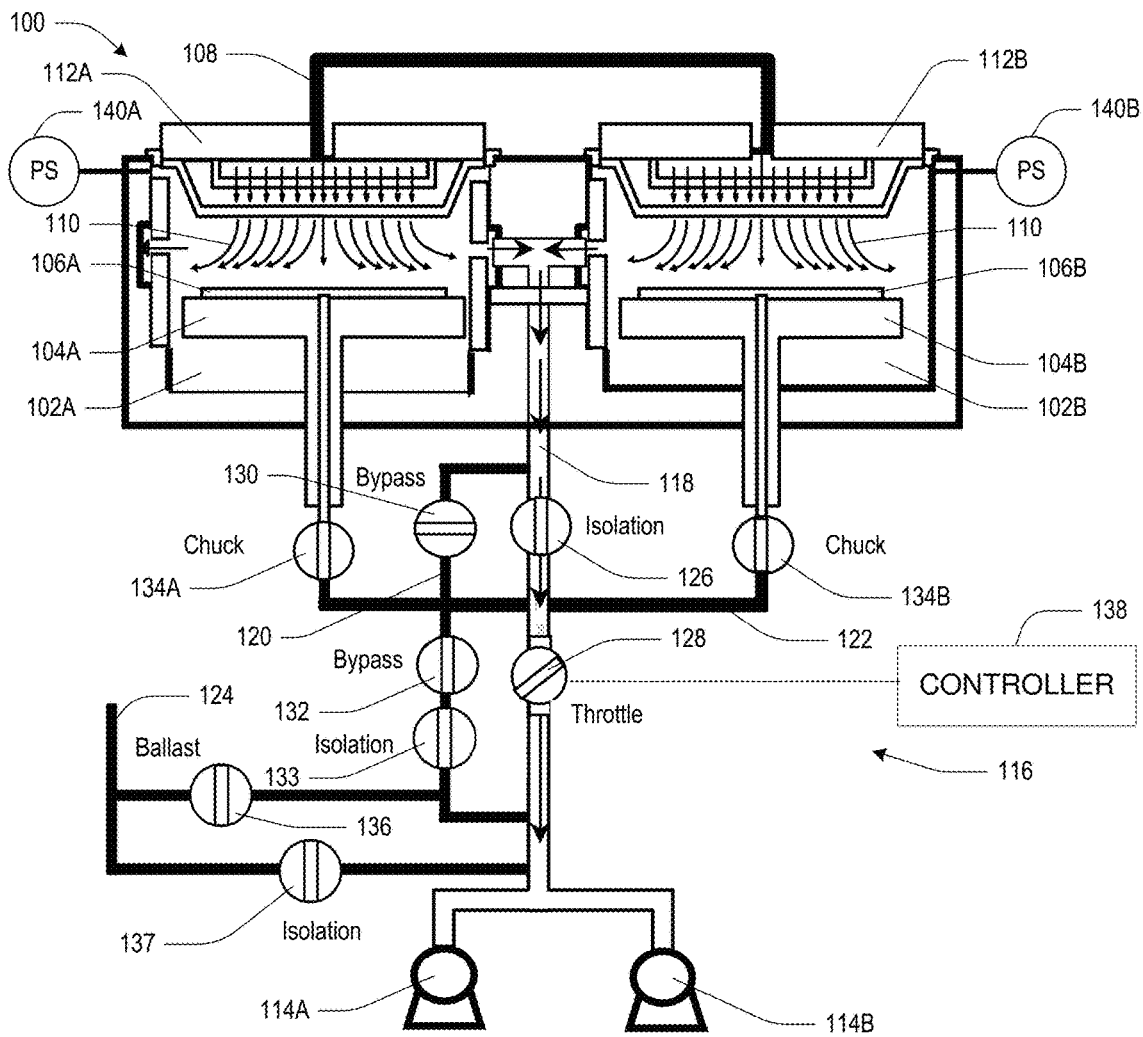
FIG. 1 illustrates a processing tool, in accordance with some embodiments.

The following disclosure provides many different embodiments, or examples, for implementing different features of the provided subject matter. Specific examples of components and arrangements are described below to simplify the present disclosure. These are, of course, merely examples and are not intended limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present application relates to a valve having an internal cavity and a gas supply that provides gas through the internal cavity directed at ends of the shaft to facilitate cleaning of material from ends of the shaft. In some embodiments, the valve is a butterfly valve having a disc mounted to the shaft. The shaft extends through a valve body. One end of the shaft is connected to an operator, such as a motor operator, and the other end of the shaft is coupled to a gas supply. The hollow shaft includes openings positioned near ends of the shaft and deflectors arranged proximate the openings to direct gas supplied from the gas supply at end interfaces where the shaft abuts the valve body. In some embodiments, the valve is a throttle valve coupled between a pump and a process chamber. The valve position is controlled to provide a vacuum environment in the process chamber. A chuck valve upstream of the throttle valve provides a negative pressure for a chuck in the process chamber for holding a workpiece, such as a semiconductor wafer, for processing.

FIG. 1 illustrates a diagram of a processing tool 100, in accordance with some embodiments. According to some embodiments, the processing tool 100 comprises process chambers 102A, 102B, having support surfaces 104A, 104B for supporting semiconductor substrates 106A, 106B during a process operation. Various process operations may be performed in the process chambers 102A, 102B to fabricate the semiconductor substrates 106A, 106B, such as deposition processes, etch processes, cleaning processes, or some other suitable processes. Example deposition processes include an atomic layer deposition (ALD) process, a chemical vapor deposition (CVD) process, a low pressure CVD (LPCVD) process, an atomic layer chemical vapor deposition (ALCVD) process, an ultrahigh vacuum CVD (UHVCVD) process, a reduced pressure CVD (RPCVD) process, or other suitable deposition process. Example cleaning processes include processes for cleaning the semiconductor substrates 106A, 106B to remove byproducts or contaminants from the semiconductor substrates 106A, 106B or processes to clean the process chambers 102A, 102B to remove byproducts or contaminants from the process chambers 102A, 102B between process operations performed on the semiconductor substrates 106A, 106B. Example etch processes include an etch process to pattern a process layer or feature on the semiconductor substrates 106A, 106B, an etch process to remove a process layer from the semiconductor substrates 106A, 106B, such as a native oxide layer formed due to exposure of the semiconductor substrates 106A, 106B to air between process operations, or some other suitable etch process. Other structures and configurations of the process chambers 102A, 102B are within the scope of the present disclosure.

In some embodiments, the process chambers 102A, 102B comprise supply lines 108 for providing one or more process gases 110 through showerheads 112A, 112B. The process gases may comprise one or more reactive precursor gases for facilitating a chemical reaction to deposit a process layer on the semiconductor substrate 106A, 106B, one or more etchant gases to remove material from the semiconductor substrates 106A, 106B, one or more purge gases to purge the process chambers 102A between process operations, or one or more cleaning gases.

In some embodiments, the process chambers 102A, 102B operate under vacuum conditions, where the pressure in the process chambers 102A, 102B is less than 1 ATM. To generate a vacuum environment, one or more pumps 114A, 114B are coupled to exhaust piping 116 communicating with the process chambers 102A, 102B. In some embodiments, the exhaust piping 116 comprises a main exhaust line 118, a bypass line 120, a chuck line 122, and a purge line 124. An isolation valve 126 and a throttle valve 128 are provided in the main exhaust line 118 between the process chambers 102A, 102B and the pumps 114A, 114B. The bypass line 120 is connected to the main exhaust line 118 upstream of the isolation valve 126 and downstream of the throttle valve 128. Bypass valves 130, 132 and an isolation valve 133 are connected in the bypass line 120. The chuck line 122 is connected to the bypass line 120 between the bypass valves 130, 132. In the illustration of FIG. 1, the chuck line 122 passes behind the main exhaust line 118 without connecting to the main exhaust line 118. Chuck valves 134A, 134B are provided in the chuck line 122 to the support surfaces 104A, 104B. The purge line 124 is connected to the main exhaust line 118 downstream of the throttle valve 128 and to the bypass line 120 downstream of the isolation valve 133. A ballast valve 136 and an isolation valve 137 are connected in the purge line 124 to the main exhaust line 118. Other structures and configurations of the exhaust piping 116 are within the scope of the present disclosure.

During a process operation in which gas is supplied to the process chambers 102A, 102B by the showerheads 112A, 112B, the isolation valve 126, the bypass valve 132, and the isolation valve 133 are open and the bypass valve 130 is closed. In some embodiments, the pumps 114A, 114B operate at a substantially constant speed, and the pressure in the process chambers 102A, 102B is controlled by the position of the throttle valve 128. The position of the throttle valve 128 is controlled by a controller 138 to control the pressure in the process chambers 102A, 102B. The controller 138 provides a signal to an operator attached to the throttle valve 128 to control the position of the throttle valve 128. In some embodiments, pressure sensors 140A, 140B communicating with the process chambers 102A, 102B provide feedback to the controller 138 for controlling the pressure in the process chambers 102A, 102B. Moving the throttle valve 128 in the open direction tends to decrease the pressure in the process chambers 102A, 102B, and moving the throttle valve 128 in the close direction tends to increase the pressure in the process chambers 102A, 102B.

In some embodiments, a vacuum is provided at the support surfaces 104A, 104B for securing the semiconductor substrates 106A, 106B. After a robotic tool (not shown) positions the semiconductor substrates 106A, 106B on the support surfaces 104A, 104B, the chuck valves 134A, 134B are opened to create a vacuum at the support surfaces 104A, 104B and secure the semiconductor substrates 106A, 106B during the process operation. The vacuum caused by the exhaust flow through the main exhaust line 118 is communicated through the open bypass valve 132 and the bypass line 120 through the chuck line 122 and the open chuck valves 134A, 134B to the support surfaces 104A, 104B to generate a vacuum for holding the semiconductor substrates 106A, 106B. After the process operation, the chuck valves 134A, 134B are closed to release the vacuum and allow the robotic tool to remove the semiconductor substrates 106A, 106B from the support surfaces 104A, 104B.

In some embodiments, the exhaust piping 116 is operated in a bypass mode that bypasses the throttle valve 128 by opening the bypass valves 130, 132 and closing the isolation valve 126. Purge gas may be provided by opening the ballast valve 136 to purge the bypass line 120. In some embodiments, the chuck valves 134A, 134B also open to purge the chuck line 122

Figure 2:
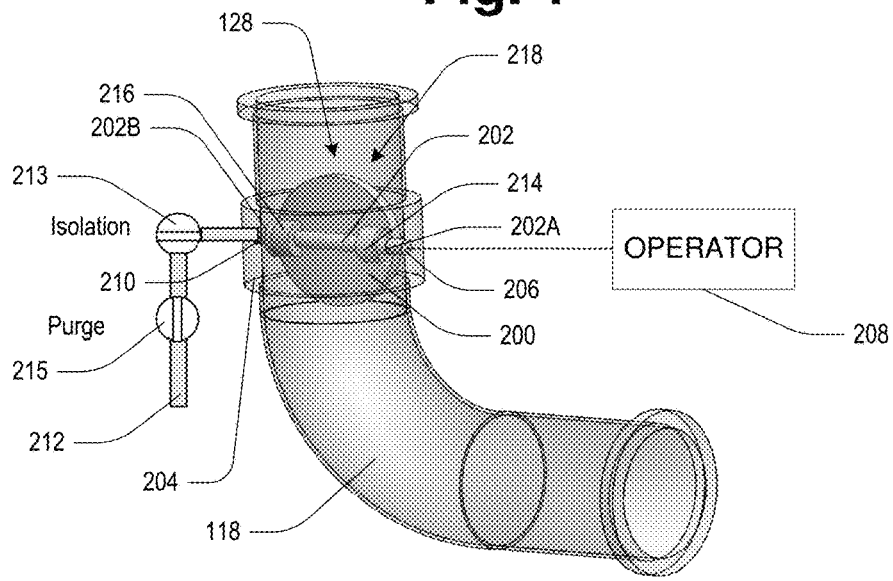
FIG. 2 is an isometric view of a valve, in accordance with some embodiments.

Referring to FIG. 2, an isometric view of the throttle valve 128 is provided, in accordance with some embodiments. In some embodiments, the throttle valve 128 is a butterfly valve comprising a disc 200 mounted to a shaft 202. The radial position of the shaft 202 determines the position of the disc 200 and the degree to which the throttle valve 128 is open. The shaft 202 extends through a valve body 204. One end 206 of the shaft 202 is connected to an operator 208, such as a motor operator, and the other end 210 of the shaft 202 is coupled to a gas line 212. The shaft 202 may be coupled to the gas line 212 by a rotary gas joint or a flexible gas line. In some embodiments, the operator 208 comprises a motor-driven shaft (not shown) that engages the shaft 202 of the throttle valve 128. In some embodiments, the shaft 202 defines an axial bore 234 (shown below in FIGS. 3A, 3B, 4A, and 4B) that communicates with the gas line 212 and radial bores 236A, 236B, 236C, 238A, 238B, 238C (shown below in FIGS. 3A, 3B, 4A, and 4B) that communicate with the axial bore 234 and are positioned near the ends 206, 210 of the shaft 202. In some embodiments, the axial bore 234 defines an internal cavity, and the radial bores 236A, 236B, 236C, 238A, 238B, 238C define openings communicating with the internal cavity. In some embodiments, the shaft 202 comprises a hollow portion defined by the axial bore 234 and the radial bores 236A, 236B, 236C, 238A, 238B, 238C. Deflectors 214, 216 are coupled to the shaft 202 proximate the radial bores to direct gas supplied through the gas line 212 at end interfaces 202A, 202B where the shaft 202 abuts the valve body 204. The disc 200, the shaft 202, and the deflectors 214, 216 define a disc assembly 218. During operation of the throttle valve 128, very little flow is seen at the end interfaces 202A, 202B where the shaft 202 abuts the valve body 204. Due to the low flow condition, byproducts from the various operations can deposit on the shaft 202. According to some embodiments, during a cleaning operation, gas provided by the gas line 212 is directed by the deflectors 214, 216 at the end interfaces 202A, 202B to reduce the amount of byproduct buildup. An isolation valve 213 and a purge valve 215 are connected in the gas line 212 for controlling flow of a gas through the gas line 212 for cleaning the shaft 202. In some embodiments, to clean the shaft 202, the isolation valve 213 and the purge valve 215 are opened to provide the cleaning gas. In some embodiments, the cleaning gas comprises nitrogen.

Figure 3A:
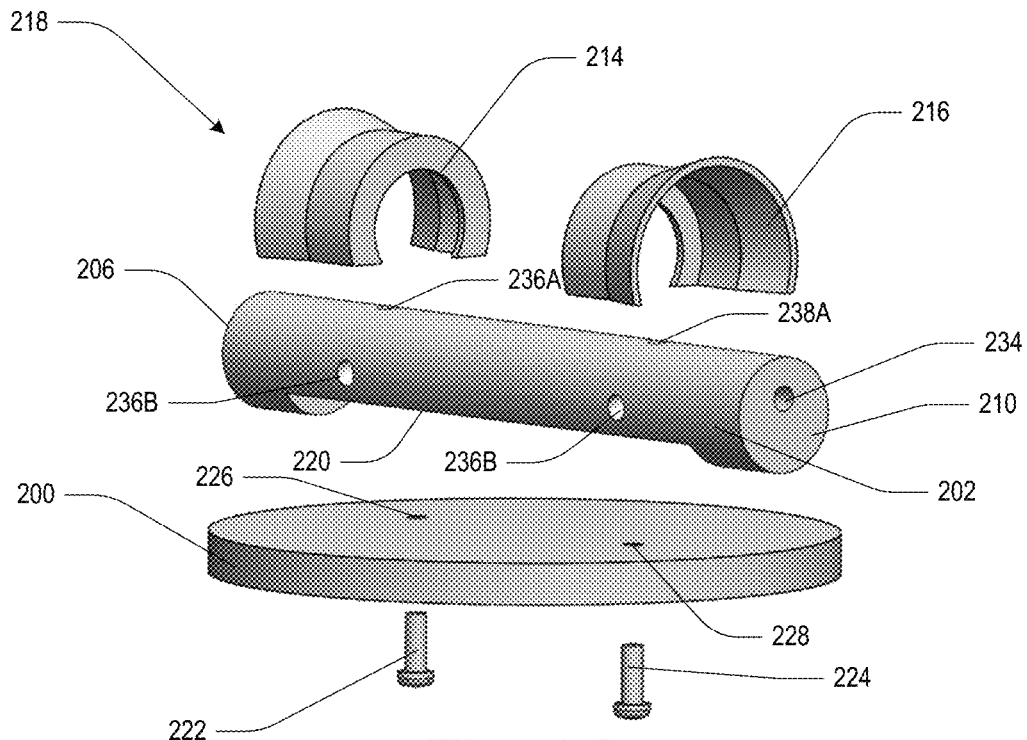
FIGS. 3A and 3B are exploded views of a disc assembly, in accordance with some embodiments.
Figure 3B:
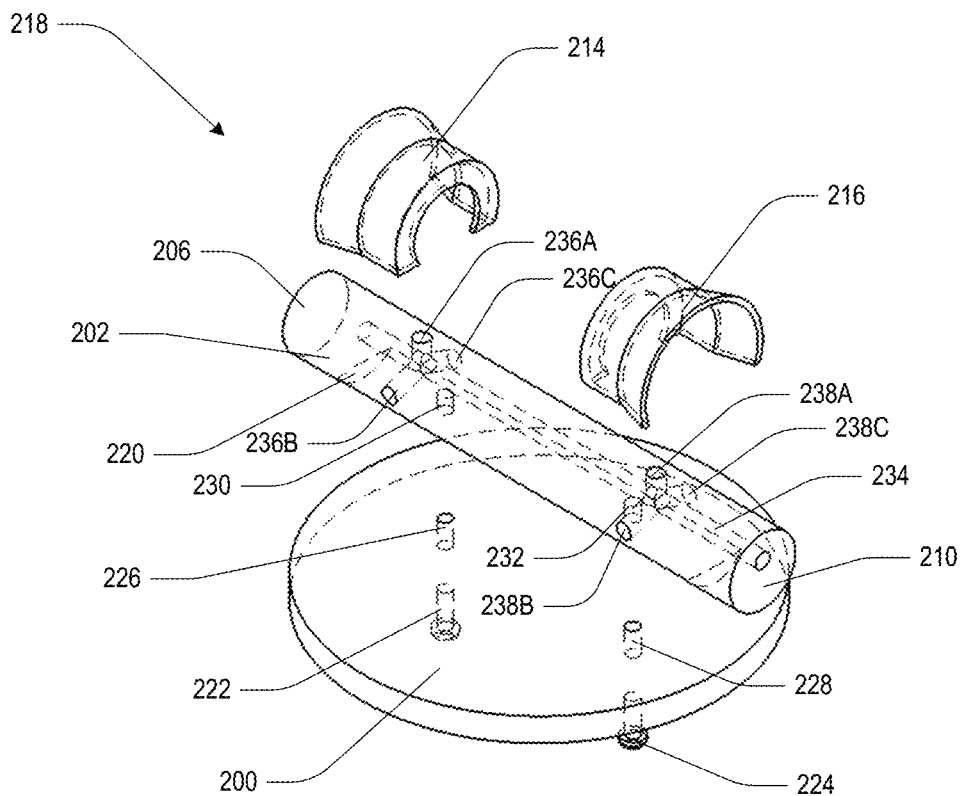

Referring to FIGS. 3A and 3B, exploded views of the disc assembly 218 of the throttle valve 128 are provided, in accordance with some embodiments. FIG. 3A illustrates a solid view of the disc assembly 218, and FIG. 3B illustrates a view with phantom lines to show internal features of the disc assembly 218. According to some embodiments, the shaft 202 defines a notch 220 for receiving the disc 200. In some embodiments, fasteners 222, 224 pass through channels 226, 228 defined by the disc 200 to engage channels 230, 232 and secure the disc 200 to the shaft 202. In some embodiments, the fasteners 222, 224 and channels 230, 232 are threaded to allow the fasteners 222, 224 to engage the channels 230, 232.

According to some embodiments, the shaft 202 defines an axial bore 234 that extends along the axial length of the shaft 202. In some embodiments, the axial bore 234 starts at the end 210 of the shaft 202 where the gas line 212 connects to the shaft 202, but the axial bore 234 does not extend axially to the end 206 of the shaft 202 where the operator 208 connects to the shaft 202. The shaft 202 defines radial bores 236A, 236B, 236C, 238A, 238B, 238C that communicate with the axial bore 234.

Figure 4A:
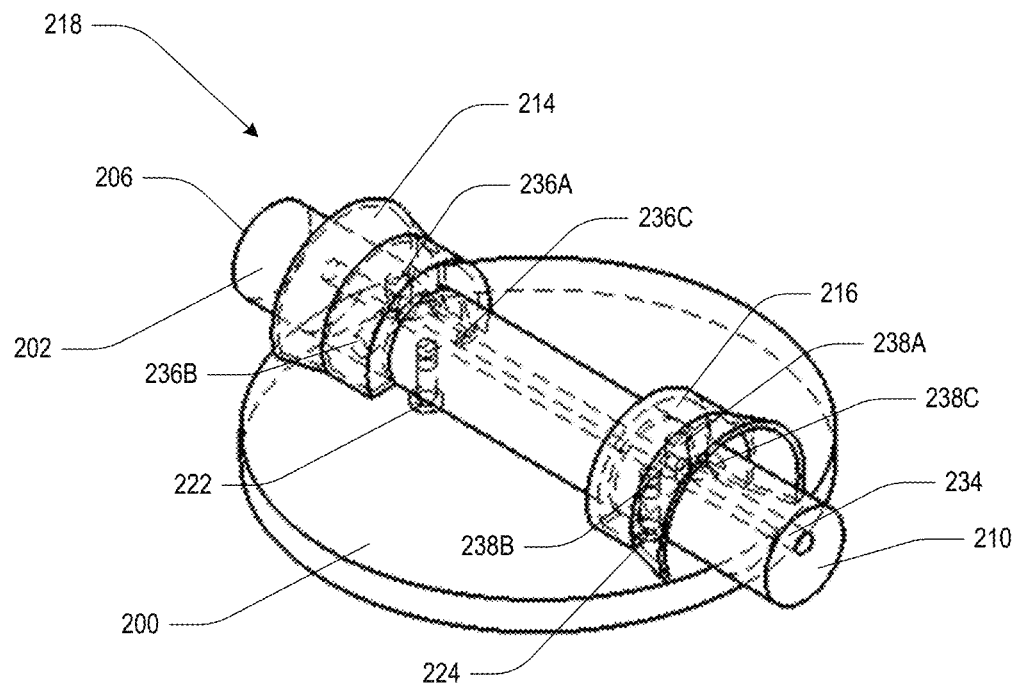
FIG. 4A is an assembled view of a disc assembly, in accordance with some embodiments.
Figure 4B:
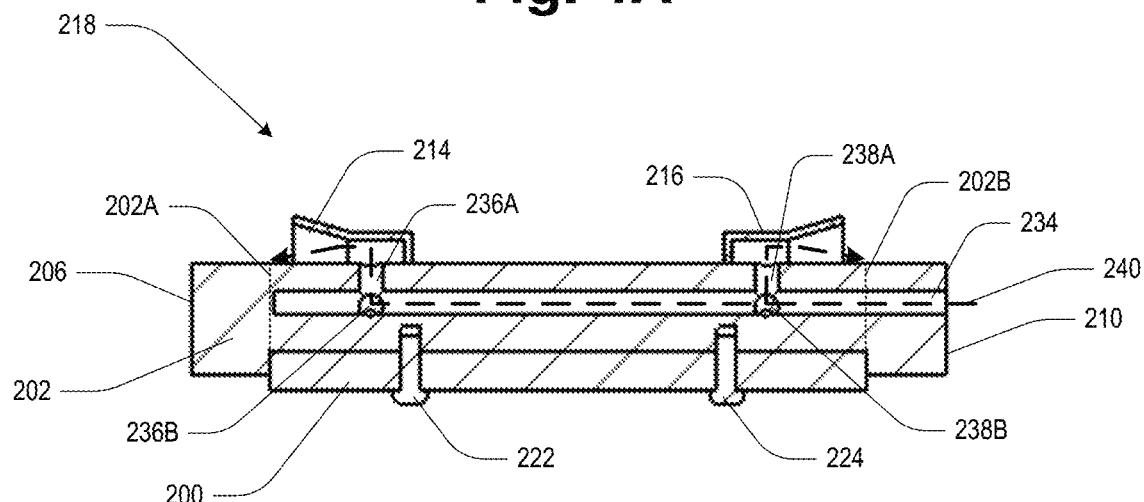
FIG. 4B is a cross-sectional view of a disc assembly, in accordance with some embodiments.

Referring to FIGS. 4A and 4B, an assembled view of the disc assembly 218 with phantom lines to show internal features of the disc assembly 218 and a cross-sectional view of the disc assembly 218 are provided, respectively, in accordance with some embodiments. Gas 240 from the gas line 212 (see FIG. 2) enters the axial bore 234 and flows along the axial length of the shaft 202. The gas 240 exits the axial bore 234 through the radial bores 236A, 236B, 236C, 238A, 238B, 238C. The gas 240 exiting the radial bores 236A, 236B, 236C impinges on the deflector 214 and is directed at the shaft 202 near the end interface 202A (see FIG. 2) where the shaft 202 abuts the valve body 204. The gas 240 exiting the radial bores 238A, 238B, 238C impinges on the deflector 216 and is directed at the shaft 202 near the end interface 202B (see FIG. 2) where the shaft 202 abuts the valve body 204. In some embodiments, the gas 240 comprises nitrogen.

Figure 4C:
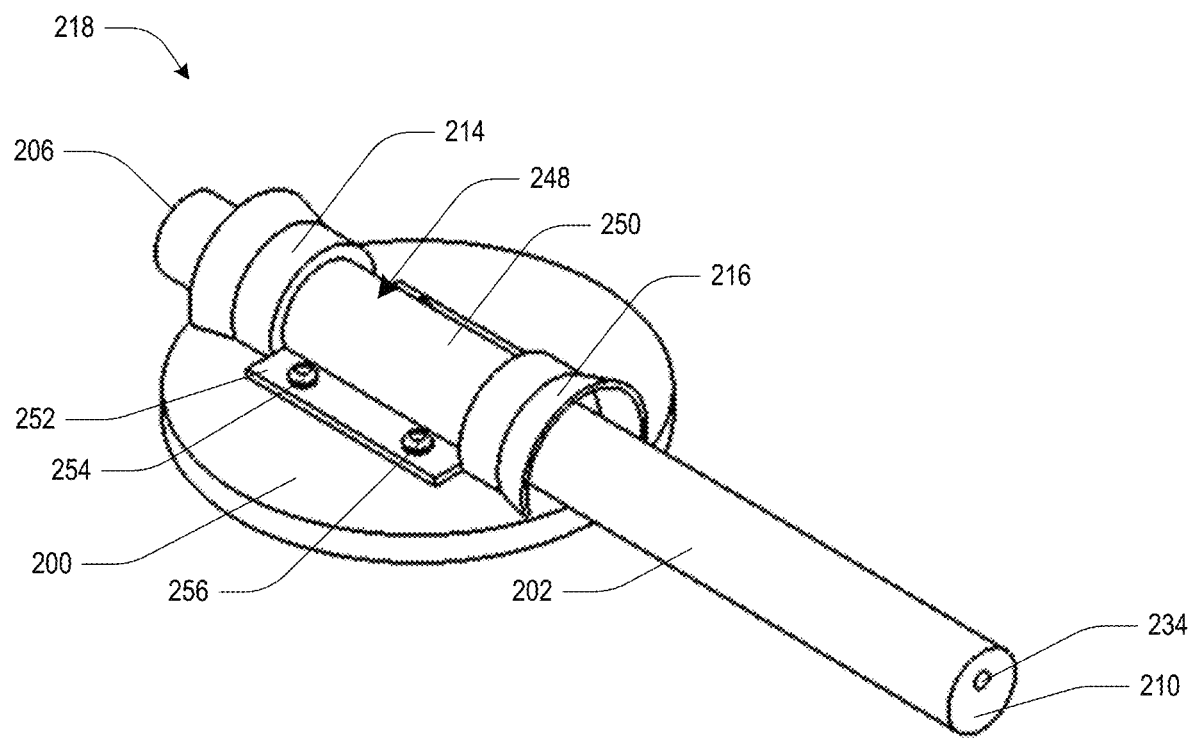
FIG. 4C is an assembled view of a disc assembly, in accordance with some embodiments.

Referring to FIG. 4C, an assembled view of the disc assembly 218 with an alternative mounting arrangement for the deflectors 214, 216 is provided, in accordance with some embodiments. A mounting plate 248 connects the deflectors 214, 216. In some embodiments, the mounting plate 248 comprises a shaped portion 250 that matches the shape of the shaft 202 and a flange portion 252 that abuts the disc 200. Fasteners 254, 256 secure the mounting plate 248 and attached deflectors 214, 216 to the disc 200. In some embodiments, the deflectors 214, 216 and the mounting plate 248 are fabricated as a single member, such as by stamping, casting, machining, molding, or some other suitable process. In some embodiments, the deflectors 214, 216 are coupled to the mounting plate 248, such as by an adhesive or by a welding process or some other suitable attachment process.

According to some embodiments, the gas impingement serves to reduce or remove byproducts deposited on the shaft 202 during process operations, thereby improving reliability of the throttle valve 128. Improving the reliability of the throttle valve 128 improves processing tool 100. For example, the operation of the throttle valve 128 impacts the efficacy of the support surfaces 104A, 104B. If the throttle valve 128 were to become sufficiently fouled by byproducts, the throttle valve 128 may not move properly according to the signals from the controller 138, and the level of vacuum provided to the support surfaces 104A, 104B may be degraded. As a result, the processing tool 100 may register a chuck failure. Semiconductor substrates 106A, 106B processed during the cycle that recorded the chuck failure may not have been secured properly during the process operation and may need to be scrapped, thereby reducing yield and throughput of the processing tool 100.

Figure 5:
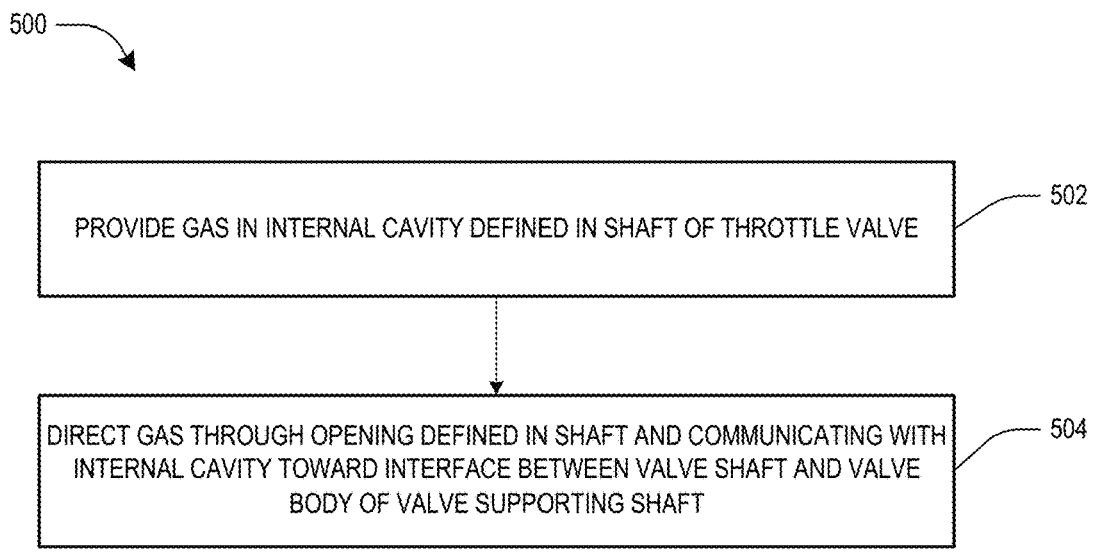
FIG. 5 illustrates a method for cleaning a valve, in accordance with some embodiments.

Referring to FIG. 5, a flow diagram illustrating a method 500 for cleaning a valve, such as the throttle valve 128, is provided, in accordance with some embodiments. According to some embodiments, the method is performed by a controller comprising a computing device that executes computer-executable instructions stored in a non-transitory computer readable medium. In some embodiments, the cleaning process for cleaning the throttle valve 128 is integrated with a process for cleaning the process chambers 102A, 102B. In block 502, a gas 240 is provided in an internal cavity, such as the axial bore 234, defined in a shaft 202 of a throttle valve 128. At block 504, the gas 240 is directed through an opening, such as a radial bore 236A, 236B, 236C, 238A, 238B, 238C, defined in the shaft 202 and communicating with the internal cavity toward an end interface 202A, 202B between the shaft 202 and a valve body 204 of the throttle valve 128 supporting the shaft 202.

Figure 6:
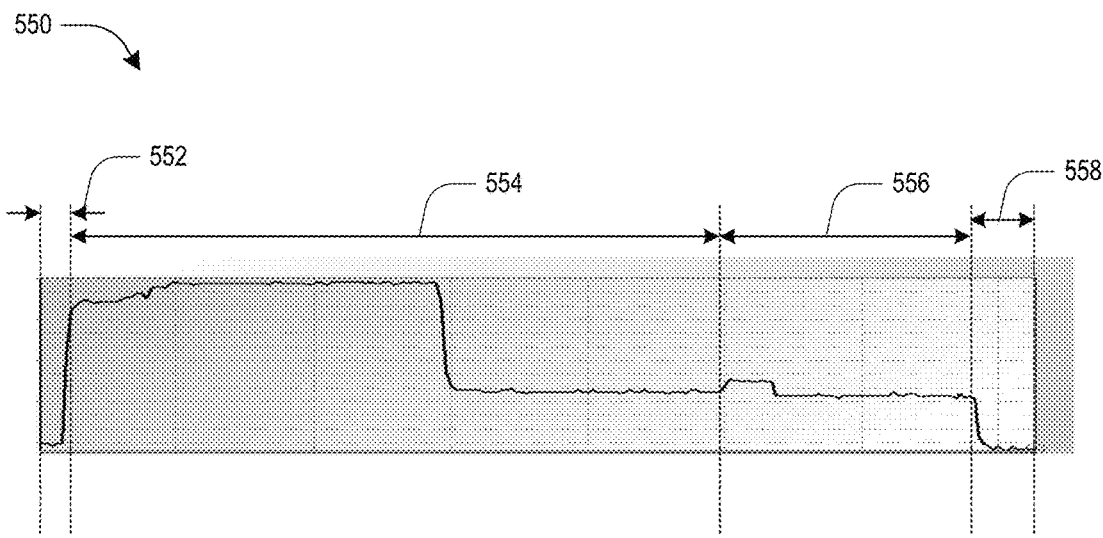
FIG. 6 illustrates a diagram for a cleaning process, in accordance with some embodiments.

Referring to FIG. 6, a diagram 550 for a cleaning process is provided, in accordance with some embodiments. The diagram 550 shows pressure in the process chambers 102A, 102B during a cleaning process.

During a time interval 552 for cleaning the throttle valve 128, the bypass valves 130, 132, the isolation valve 133, and the chuck valves 134A, 134B are closed and the throttle valve 128 is opened by the controller 138 to the full open position. The isolation valve 213 and the purge valve 215 are opened to provide the gas 240 through the gas line 212 to clean the shaft 202. The ballast valve 136 is open to provide purge gas and avoid backflow into the bypass line 120. Closing the isolation valve 133 avoids the byproducts flowing through and fouling the chuck line 122. In some embodiments, the gas 240 provided by the purge valve 215 and the isolation valve 213 to the shaft 202 of the throttle valve 128 comprises nitrogen. In some embodiments, the throttle valve 128 cleaning cycle is performed after the pressure in the process chambers 102A, 102B falls below a threshold. In some embodiments, the threshold is about 1 Torr.

During a time interval 554 for cleaning the process chambers 102A, 102B, the isolation valve 213, the purge valve 215, and the ballast valve 136 are closed and the isolation valve 133 is opened after the cleaning of the throttle valve 128. The position of the throttle valve 128 is controlled by the controller 138 based on feedback from the pressure sensors 140A, 140B. The bypass valves 130, 132, the isolation valve 133, and the chuck valves 134A, 134B are opened and the ballast valve 136 is closed, allowing a flow path from the support surfaces 104A, 104B through the chuck valves 134A, 134B, the bypass valve 132, and the isolation valve 133 to the main exhaust line 118.

During a time interval 556 for exiting the cleaning stage and seasoning the process chambers 102A, 102B, the bypass valves 130, 132, the isolation valve 133, and the chuck valves 134A, 134B are closed and the ballast valve 136 is opened. The position of the throttle valve 128 is controlled by the controller 138 based on feedback from the pressure sensors 140A, 140B.

During a time interval 558 for cleaning the throttle valve 128, the bypass valve 132, the isolation valve 133, and the chuck valves 134A, 134B are closed and the throttle valve 128 is opened by the controller 138 to the full open position. The isolation valve 213 and the purge valve 215 are opened to provide the gas 240 through the gas line 212 to clean the shaft 202. The ballast valve 136 is open to provide purge gas and avoid backflow into the bypass line 120. The bypass valve 130 is open to exhaust the bypass line 120.

Figure 7:
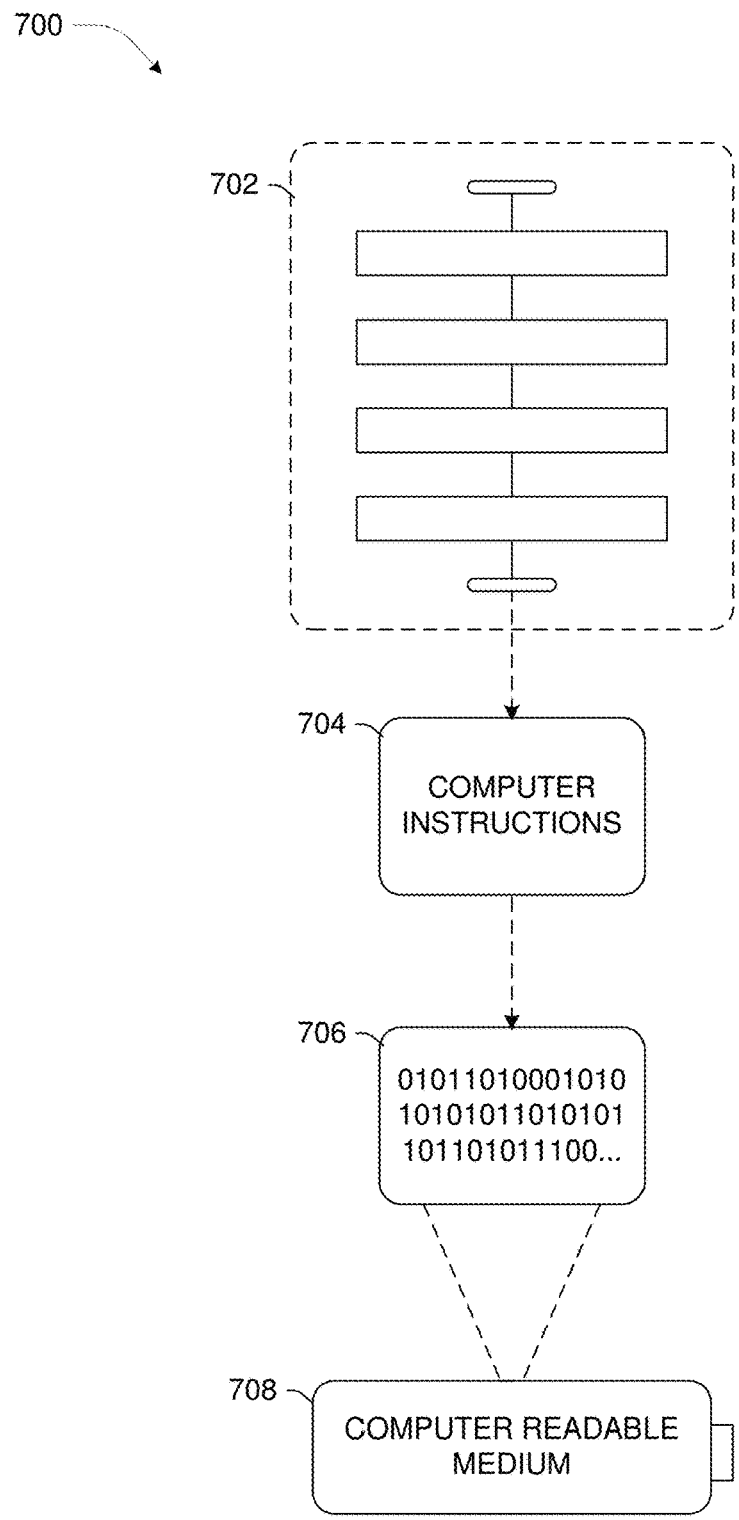
FIG. 7 illustrates an example computer-readable medium wherein processor-executable instructions configured to embody one or more of the provisions set forth herein are comprised, in accordance with some embodiments.

FIG. 7 illustrates an example computer-readable medium wherein processor-executable instructions configured to embody one or more of the provisions set forth herein are comprised, in accordance with some embodiments. In some embodiments, the implementation 700 illustrated in FIG. 7 comprises a computer-readable medium 708, such as a CD-R, DVD-R, flash drive, a platter of a hard disk drive, etc., on which is encoded computer-readable data 706. According to some embodiments, the computer-readable data 706, such as binary data comprising at least one of a zero or a one, in turn comprises a set of processor-executable computer instructions 704 configured to operate according to one or more of the principles set forth herein. In some embodiments, the processor-executable computer instructions 704 are configured to perform a method 702, such as at least some of the operations described herein with regard to the controller 138 in FIG. 1. In some embodiments, the processor-executable computer instructions 704 are configured to implement a system, such as at least some of the processing tool. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may include a process running on a processor, a processor, an object, an executable, a thread of execution, a program, or a computer. By way of illustration, both an application running on a controller and the controller can be a component. One or more components may reside within a process or thread of execution and a component may be localized on one computer or distributed between two or more computers.

Furthermore, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to comprise a computer program accessible from any computer-readable device, carrier, or media. Of course, many modifications may be made to this configuration without departing from the scope or spirit of the claimed subject matter.

Figure 8:
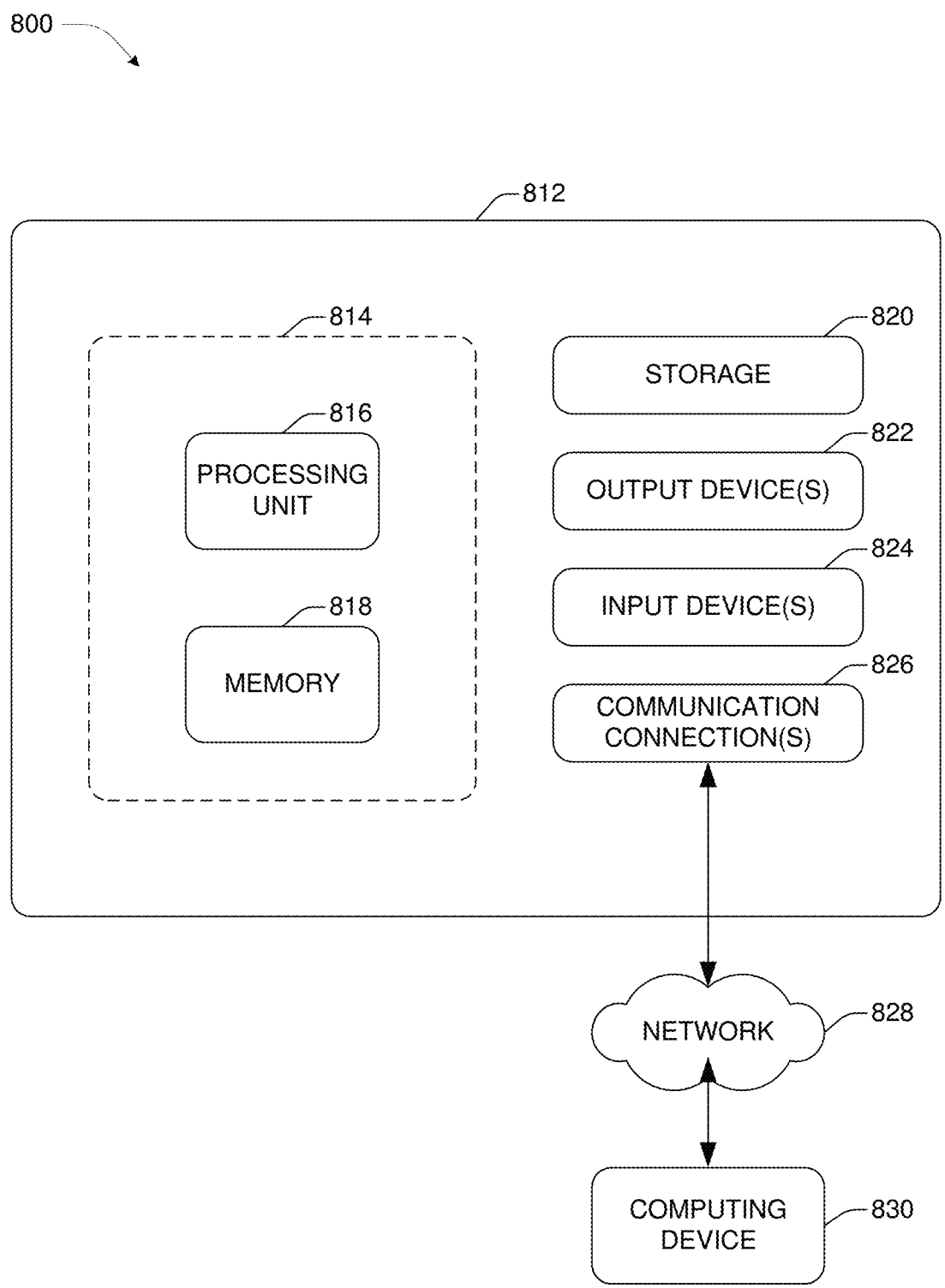
FIG. 8 illustrates an example computing environment wherein one or more of the provisions set forth herein are implemented, in accordance with some embodiments.

FIG. 8 illustrates an example computing environment wherein one or more of the provisions set forth herein are implemented, in accordance with some embodiments. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions are implemented as program modules, such as functions, objects, Application Programming Interfaces (APIs), data structures, and the like, that perform particular tasks or implement particular abstract data types. Typically, the functionality of the computer readable instructions are combined or distributed as desired in various environments.

FIG. 8 illustrates an example of a system 800 comprising a computing device 812 configured to implement one or more embodiments provided herein, such as at least one of the controller 138 in FIG. 1. In a configuration, the computing device 812 includes at least one processing unit 816 and memory 818. In some embodiments, depending on the exact configuration and type of computing device, the memory 818 is volatile, such as random-access memory (RAM), non-volatile, such as read-only memory (ROM), flash memory, etc., or some combination of the two. This configuration is illustrated in FIG. 8 by dashed line 814.

In some embodiments, the computing device 812 includes additional features or functionality. For example, the computing device 812 also includes additional storage such as removable storage or non-removable storage, including, but not limited to, magnetic storage, optical storage, and the like. Such additional storage is illustrated in FIG. 8 by storage 820. In some embodiments, computer readable instructions to implement one or more embodiments provided herein are in the storage 820. The storage 820 also stores other computer readable instructions to implement an operating system, an application program, and the like. Computer readable instructions are loaded in the memory 818 for execution by the processing unit 816, for example.

The term "computer readable media" as used herein includes computer storage media. Computer storage media includes volatile and nonvolatile, removable and non-removable media implemented in any method or technology for storage of information such as computer readable instructions or other data. The memory 818 and the storage 820 are examples of computer storage media. Computer storage media includes, but is not limited to, RAM, ROM, electrically erasable programmable read-only memory (EEPROM), flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by the computing device 812. Any such computer storage media is part of the computing device 812.

In some embodiments, the computing device 812 includes communication connection(s) 826 that allow the computing device 812 to communicate with other devices. The communication connection(s) 826 include, but are not limited to, a modem, a Network Interface Card (NIC), an integrated network interface, a radio frequency transmitter/receiver, an infrared port, a USB connection, or other interfaces for connecting the computing device 812 to other computing devices. The communication connection(s) 826 include a wired connection or a wireless connection in some embodiments. The communication connection(s) 826 transmit and/or receive communication media in some embodiments.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 812 includes input device(s) 824 such as a keyboard, a mouse, a pen, a voice input device, a touch input device, an infrared cameras, video input devices, or any other suitable input device. The output device(s) 822, such as one or more displays, speakers, printers, or any other suitable output device are also included in the computing device 812. The input device(s) 824 and the output device(s) 822 are connected to the computing device 812 via a wired connection, wireless connection, or any combination thereof. In some embodiments, an input device or an output device from another computing device are used as the input device(s) 824 or the output device(s) 822 for the computing device 812. The computing device 812 also includes the communication connection(s) 826 to facilitate communications with one or more other devices.

Components of the computing device 812 are connected by various interconnects, such as a bus. Such interconnects include a Peripheral Component Interconnect (PCI), such as PCI Express, a Universal Serial Bus (USB), firewire (IEEE 13104), an optical bus structure, and the like. In another embodiment, components of the computing device 812 are interconnected by a network. For example, the memory 818 is comprised of multiple physical memory units located in different physical locations interconnected by a network.

Storage devices utilized to store computer readable instructions are distributed across a network in some embodiments. For example, a computing device 830 accessible via a network 828 stores computer readable instructions to implement one or more embodiments provided herein. The computing device 812 accesses the computing device 830 and downloads a part or all of the computer readable instructions for execution. Alternatively, the computing device 812 downloads pieces of the computer readable instructions, as needed, or some instructions are executed at the computing device 812 and some at the computing device 830.

According to some embodiments, a valve for throttling gas flow from a semiconductor processing tool includes a valve body. A shaft extends through the valve body. The shaft defines an internal cavity and a first opening communicating with the internal cavity. A first deflector is positioned on the shaft proximate the first opening and directed at a first interface between the shaft and the valve body.

According to some embodiments, a method for throttling gas flow from a semiconductor processing tool includes providing a gas in an internal cavity defined in a shaft of a valve and directing the gas through an opening defined in the shaft and communicating with the bore toward an interface between the shaft and a valve body of the valve supporting the shaft.

According to some embodiments, an apparatus includes a pump, a process chamber for processing a semiconductor substrate, piping coupling the process chamber to the pump, and a throttle valve connected in the piping between the process chamber and the pump and operable to control a pressure in the process chamber. The throttle valve includes a valve body, a shaft extending through the valve body, a disc coupled to the shaft, and a first deflector configured to direct flow of a gas toward a first interface between the valve body and the shaft.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc., depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for throttling gas flow from a semiconductor processing tool, comprising:
    coupling a first valve to a process chamber of the semiconductor processing tool during a process operation;
    providing a gas in an internal cavity defined in a shaft of the first valve configured to throttle the gas flow from the semiconductor processing tool; and
    directing the gas through a first opening defined in the shaft and communicating with the internal cavity toward a first interface between the shaft and a valve body of the first valve supporting the shaft after completion of the process operation.

2. The method of claim 1, comprising:
    rotating the shaft to control a position of a disc mounted to the shaft.

3. The method of claim 2, wherein:
    the internal cavity comprises an axial bore defined in a first end of the shaft, and
    rotating the shaft comprises rotating the shaft using an operator coupled to a second end of the shaft opposite the first end of the shaft.

4. The method of claim 1, wherein providing the gas comprises:
    coupling a gas supply to a first end of the shaft.

5. The method of claim 1, wherein providing the gas comprises:
    providing nitrogen.

6. The method of claim 1, comprising:
    coupling the first valve to a support surface of the process chamber during the process operation; and
    isolating the first valve from the support surface prior to directing the gas through the first opening defined in the shaft.

7. The method of claim 1, comprising:
    directing the gas through a second opening defined in the shaft and communicating with the internal cavity toward a second interface between the shaft and the valve body.

8. A method for throttling gas flow from a semiconductor processing tool, comprising:
    coupling a first valve to a process chamber of the semiconductor processing tool during a process operation, the first valve comprising:
        a valve body having an inner sidewall defining a hollow core;
        a shaft extending through the hollow core of the valve body, the shaft defining an internal cavity and a first opening communicating with the internal cavity; and
        a first deflector positioned on the shaft proximate the first opening and directed at a first interface between the shaft and the valve body;
    providing a gas in the internal cavity;
    throttling the gas flow from the semiconductor processing tool using the first valve; and
    directing the gas through the first opening toward the first interface after completion of the process operation using the first deflector.

9. The method of claim 8, comprising:
    rotating the shaft to control a position of a disc mounted to the shaft.

10. The method of claim 9, wherein:
    the internal cavity comprises an axial bore defined in a first end of the shaft, and
    rotating the shaft comprises rotating the shaft using an operator coupled to a second end of the shaft opposite the first end of the shaft.

11. The method of claim 8, wherein providing the gas comprises:
    coupling a gas supply to a first end of the shaft.

12. The method of claim 8, wherein providing the gas comprises:
    providing nitrogen.

13. The method of claim 8, comprising:
    coupling the first valve to a support surface of the process chamber during the process operation; and
    isolating the first valve from the support surface prior to directing the gas through the first opening defined in the shaft.

14. The method of claim 8, comprising:
    directing the gas through a second opening defined in the shaft and communicating with the internal cavity toward a second interface between the shaft and the valve body.

15. A method for throttling gas flow from a semiconductor processing tool, comprising:
    coupling a first valve to a process chamber of the semiconductor processing tool during a process operation;
    providing a gas in an internal cavity defined in a shaft of the first valve configured to throttle the gas flow from the semiconductor processing tool, wherein the internal cavity comprises an axial bore defined in a first end of the shaft; and
    directing the gas through a first opening defined in the shaft and communicating with the internal cavity toward a first interface between the shaft and a valve body of the first valve supporting the shaft after completion of the process operation.

16. The method of claim 15, comprising:
    rotating the shaft to control a position of a disc mounted to the shaft.

17. The method of claim 15, wherein providing the gas comprises:
    coupling a gas supply to a first end of the shaft.

18. The method of claim 15, wherein providing the gas comprises:
    providing nitrogen.

19. The method of claim 15, comprising:
    coupling the first valve to a support surface of the process chamber during the process operation; and
    isolating the first valve from the support surface prior to directing the gas through the first opening defined in the shaft.

20. The method of claim 15, comprising:
    directing the gas through a second opening defined in the shaft and communicating with the internal cavity toward a second interface between the shaft and the valve body.

* * * * *